Figure 1:
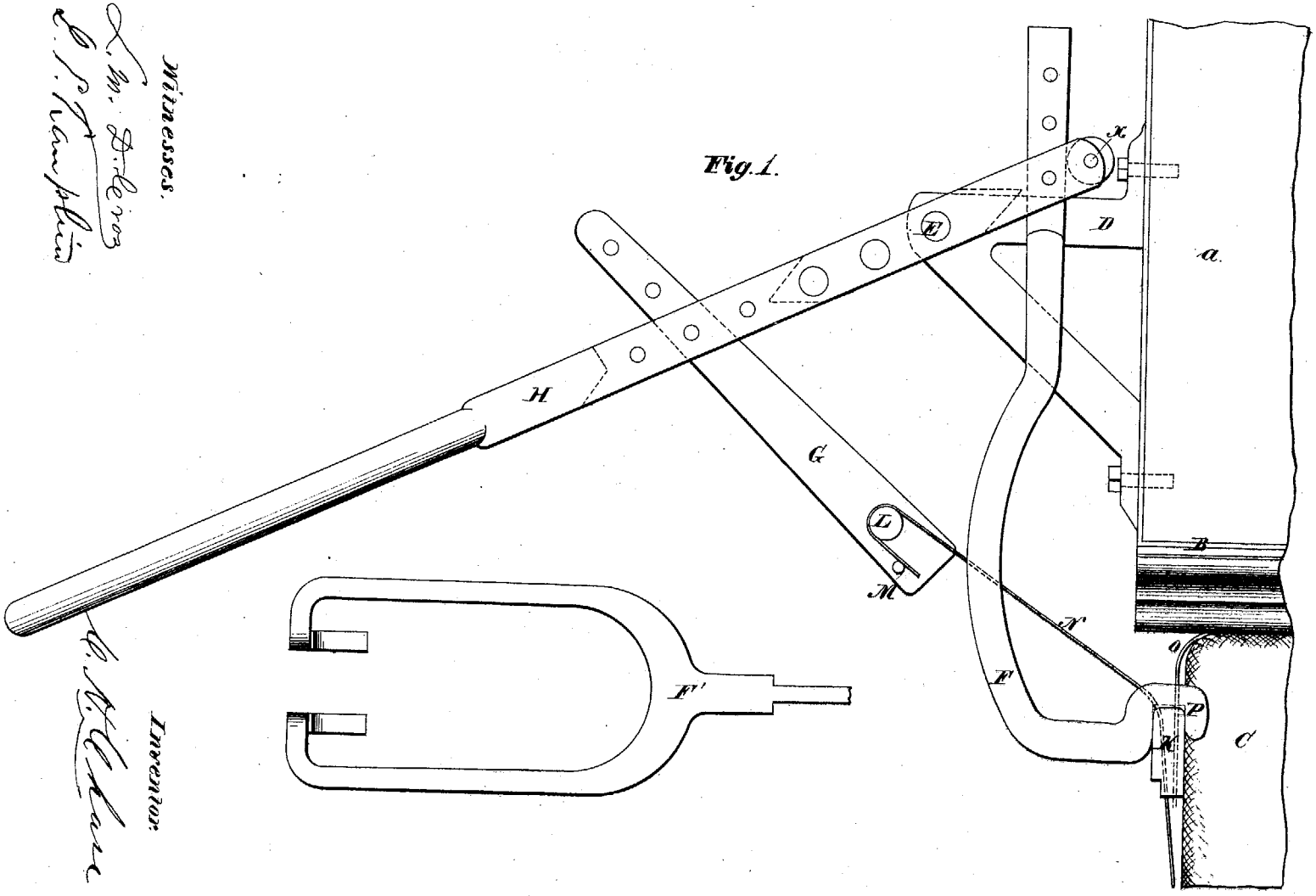

C. H. CHASE. 2 Sheets—Sheet 1.

BALE-BAND TIGHTENING DEVICE.

No. 7,260. Reissued Aug. 15, 1876.

Witnesses.

L. M. Dileroz

L. P. Tamplin

Inventor.

C. H. Chase

N. PETERS, PHOTO-LITHOGRAPHER, WASHINGTON, D. C.

2 Sheets—Sheet 2.
C. H. CHASE.
BALE-BAND TIGHTENING DEVICE.
No. 7,260. Reissued Aug. 15, 1876.
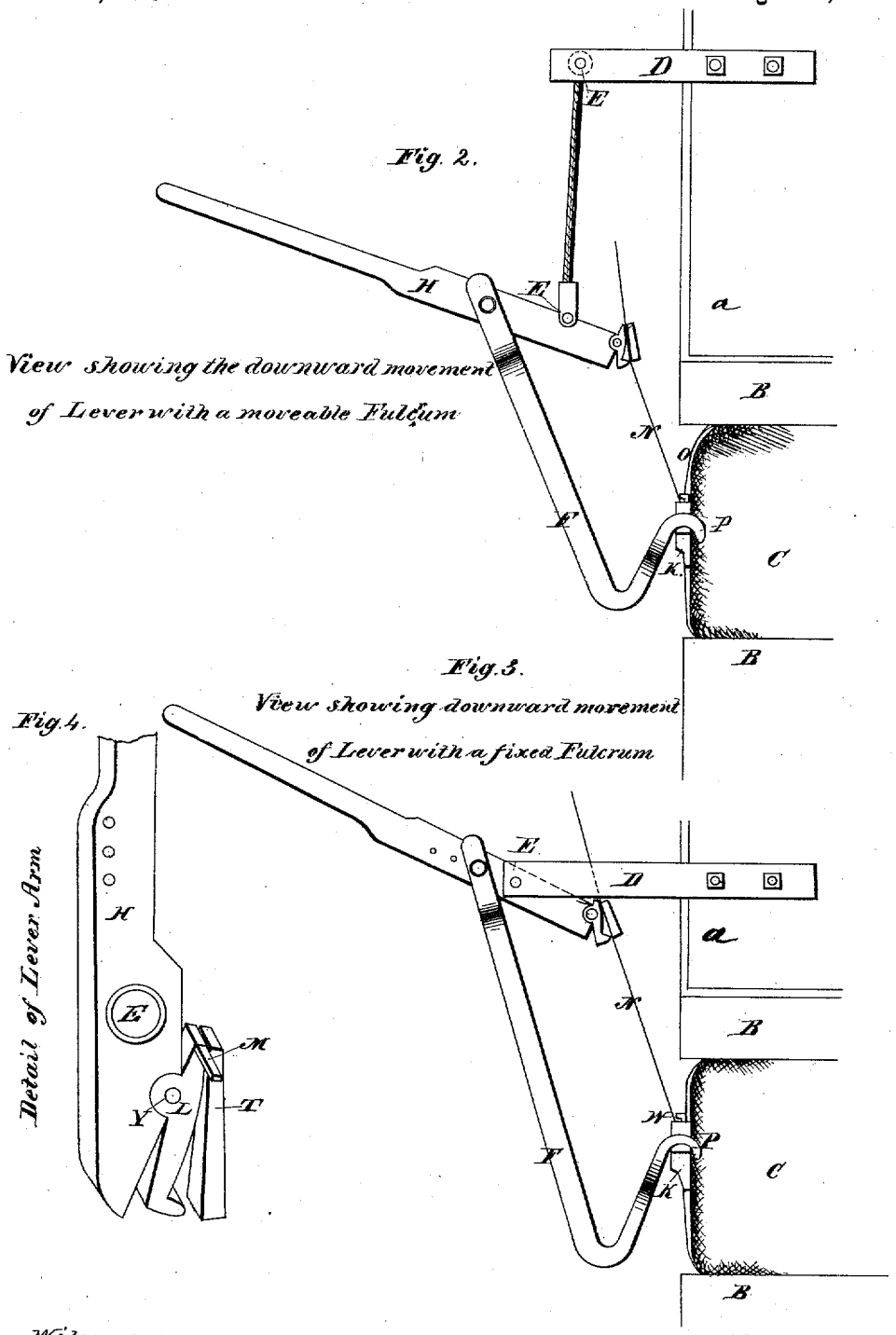
Witnesses.
L. M. Duderos
D. P. Rumplin
Inventor.
C. H. Chase
N. PETERS, PHOTO-LITHOGRAPHER, WASHINGTON, D. C.

UNITED STATES PATENT OFFICE.

CHARLES H. CHASE, OF NEW ORLEANS, LA., ASSIGNOR, BY MESNE ASSIGNMENTS, OF PART INTEREST TO JASPER THAYER AND JOHN F. BUTTS.

IMPROVEMENT IN BALE-BAND-TIGHTENING DEVICES.

Specification forming part of Letters Patent No. 170,054, dated November 16, 1875; reissue No. 7,260, dated August 15, 1876; application filed June 20, 1876.

*To all whom it may concern:*

Be it known that I, CHARLES H. CHASE, of the city of New Orleans, in the State of Louisiana, have invented certain new and useful improvements in devices or implements for tightening the iron bands around bales of cotton, hay, or packages of merchandise; and I do hereby declare that the following is a clear and exact description of my invention, which will enable others skilled in the art to which it pertains to make and use the same, reference being had to the drawings hereto affixed, which form a part of this specification.

The object of this invention is to produce a device or implement that may be affixed upon the platen of a cotton or other press, for the purpose of tightening the iron bands around the bales sufficiently to prevent too great an expansion of the bale after it is taken from the press; and it consists in the construction and combination of a system of levers and clutches, substantially as hereinafter more fully described.

In the drawings hereto annexed, Figure 1 is a side elevation of my device, showing part of the cotton-press upon which it is affixed. Fig. 2 is a similar view, showing certain modifications in the construction and arrangement of the operating parts. Fig. 3 shows the manner of operating my device; and Fig. 4 is a detailed view of the band-nippers, which form a part of my invention.

Similar letters of reference indicate corresponding parts in all the figures.

The letter A represents the upper platen of a cotton-press, and B the bars running across the bottom of the platen, of which bars a side view is here shown, and between which the hoops are passed in placing them on the bale, which is represented by the letter C. D is a bracket, secured upon and projecting from the upper platen *a* of the press, one of these brackets being placed at each end of the platen. The brackets D are perforated at E, and a rod of iron or other metal is passed through these perforations, so as to rest in the brackets, and form a bearing or fulcrum for the adjustable lever H, which terminates in a handle, by means of which it may easily be operated. Lever H has one or more longitudinal slots for the insertion of two bars, F and G, which may be pivoted upon said lever, at any suitable point, by bolts or pins passing through perforations in the forked arms of the lever. The bar F is of the configuration shown in the detail view marked F′, in Fig. 1—that is, it consists of a straight part, which is inserted within the slot in the lever H, and a forked part, which terminates in a double goose-neck, P, the purposes of which will be hereinafter explained. The bar G has affixed to its lower end two pins, L and M, which project laterally, so as to form two projecting shoulders, of such a width that the band or hoop, denoted by N, may be readily inserted between them.

It is sometimes expedient to dispense with the bar G, and in its place affix a pair of nippers to the end of the lever-arm H, as shown in Fig. 4, where T represents a stationary jaw affixed upon the end of lever H. L is a loose jaw, having a semicircular bearing, which rests in a correspondingly-shaped recess in the end or head of the lever, and Y is a bolt or pin, by which the movable jaw L is secured within its recess in lever H. M is a piece of shaped iron, affixed upon the upper end of jaw L, the object of which is to serve as a guide for the hoop in using this form of my invention, and cause the band to be clutched firmly between both jaws without possibility of its slipping.

The modified form of my invention represented in Fig. 2 consists simply in substituting a swinging for a fixed fulcrum of lever H. As it will be seen by reference to this figure, the double-acting lever H is pivoted in a forked bearing, which is suspended by a rod, rope, or chain from the cross-bar that unites the brackets D, and extends along the front of the platen, the result of the operation of the lever H being precisely the same in both cases, the lever only being moved in opposite directions.

The manner of operating my improved band-tightener is as follows: The goose-neck P is placed over the buckle K, one end of the hoop being attached to the buckle. The other loose end is passed upward and through the buckle, and either passed around the shoulders L and M of bar G, as shown in Fig. 1, or inserted between the jaws L and T at the end of lever H, as shown in Figs. 2 and 3, the operation of the double-acting lever H being the same in both cases, except that it is reversed. Lever H is then depressed, when the result will be that one end of the band N will be drawn upward, while the other end of the band, to which the buckle K is rigidly affixed, will be forced in a downward direction by the goose-neck P and forked bar F, thereby thoroughly tightening the band with an amount of leverage that may readily be adjusted by adjusting the bar F and bar G (when used) in different bearings in the forked lever H.

It is obvious that the relative position of bars F and G may be changed without altering the operation of my device, it being then only necessary to move the lever H in the opposite direction in tightening the bands around the bale.

Having thus described my invention, I claim and desire to secure by Letters Patent of the United States—

1. The combination of the platen *a*, brackets D D, and double-acting lever H, the latter having its fulcrum in a rod or cross-piece, uniting the brackets D D, substantially as and for the purpose herein shown and specified.

2. The combination of the double-acting lever H, having a series of perforations, with a fulcrum-pin resting in brackets D D, projecting from the platen *a* of a cotton or other press, whereby the fulcrum or bearing of said lever may be changed to change the amount of leverage to be applied, substantially as and for the purpose hereinbefore set forth.

3. The combination of the double-acting lever H, bar F, having clutch or goose-neck P, and bar G, having the pins L M, substantially as and for the purpose herein shown and specified.

4. The combination of the double-acting lever H, having the nipper-jaws L T, with the force-bar F, having clutch or goose-neck P, substantially as and for the purpose herein shown and specified.

5. The combination of the lever H, having a fixed jaw, T, with the loose jaw L, pivoted at Y, and having the guide-piece M, substantially as and for the purpose herein shown and specified.

C. H. CHASE.

Witnesses:
L. M. Du Cros,
J. T. Lamphin.